April 11, 1961 R. G. BROWN 2,978,765
METHOD AND MEANS FOR ALLOYING MOLTEN METALS
Filed June 13, 1957 2 Sheets-Sheet 1

INVENTOR.
ROBERT G. BROWN
BY Alfred C Body
ATTORNEY

April 11, 1961 R. G. BROWN 2,978,765
METHOD AND MEANS FOR ALLOYING MOLTEN METALS
Filed June 13, 1957 2 Sheets-Sheet 2

INVENTOR.
ROBERT G. BROWN
BY
*Alfred C Baly*
ATTORNEY

United States Patent Office 2,978,765
Patented Apr. 11, 1961

2,978,765
METHOD AND MEANS FOR ALLOYING MOLTEN METALS

Robert G. Brown, Parma, Ohio, assignor to Cleveland Electro Metals Co., Cleveland, Ohio, a corporation of Ohio Filed June 13, 1957, Ser. No. 665,883

33 Claims. (Cl. 22—215)

This invention pertains to the art of the alloying of one metal to another while in the molten state, and more particularly to means and method for adding low melting temperature, low density metals to molten, high melting temperature, high density metals.

The invention is particularly applicable to the adding of aluminum to steel while the steel is being poured into an ingot mold and will be described with particular reference thereto, although it will be appreciated that the invention has broader applications such as for the adding of metals, having similar characteristics to aluminum, to molten steel or to other high density, high melting temperature metals as they are being poured into a mold.

Aluminum is added to steel for both deoxidizing the molten steel and for alloying of the aluminum with the steel. Steel with aluminum added is normally referred to as "killed steel" as distinguished from steel without the aluminum added which is normally referred to as a "rimmed steel."

Aluminum is known to have a greater affinity for oxygen than does iron and when added to the molten steel at the time of pouring reacts with any oxygen dissolved in the steel to form aluminum oxide, a non-metallic which normally floats to the surface.

The residual aluminum left after deoxidizing gives a desirable grain refining effect on the steel, assisting in the deep drawing of the steel in subsequent manufacturing operation. Furthermore, the aluminum appears to prevent an age hardening effect in the steel which would otherwise require the steel to be reheated prior to stamping or drawing operations if the steel happened to have been in storage for periods longer than two or three weeks following the rolling operation.

The addition of aluminum to steel in the ingot mold has heretofore been a generally unsatisfactory process resulting in increased scrap from each ingot over "rimmed" steel and thus has only been used where the improved characteristics of the "killed" steel are required and the customer is willing to pay a premium price.

The present invention has made apparent a number of characteristics of aluminum making it difficult to add to molten steel, a principal one being that it is lighter than steel, and unless forcefully submerged, will float on top like oil on water. Here the hot aluminum burns in the oxygen of the atmosphere to form a scum of aluminum oxide and is thus wasted. In an ingot mold, this scum is carried downwardly into the molten steel by the continued pouring of steel thereinto, where, unless it is able to again float to the surface, it forms undesirable inclusions.

The present invention deals with this problem by forcing the aluminum to principally melt below the surface of the molten steel so that the steel itself protects the aluminum from the atmosphere.

Another characteristic of aluminum making it difficult to add to molten steel is its formation of an outer film of aluminum oxide whenever exposed to oxygen. This oxide film is very tenacious and not only prevents further reaction between the oxygen and the aluminum, but if the aluminum is melted by submerging it in a bath of molten steel, acts like a diaphragm to prevent the molten aluminum from mixing with and diffusing into the steel where it can perform its work. This diaphragm will form around individual globules of molten aluminum which globules then remain after the steel has hardened.

Obviously if the film can be ruptured, then the intermixture of the aluminum with the steel can be effected.

The problem of rupturing this film, however, becomes more difficult as the viscosity of the steel increases due to its cooling. This problem is thus aggravated by the high heat conductivity and high latent heat of fusion of aluminum. Thus if a solid aluminum block is forcibly plunged below the surface of the steel, the aluminum conducts heat away from the surrounding layer of molten steel faster than heat can be conducted to it. The temperature of the layer thus drops rapidly and thickens. In this thickened state it impedes the rupture of the film and thus the diffusion of the aluminum throughout the steel. The aluminum is trapped in the form of a globule which causes blistering in the final rolled strip and this blistered portion must be scrapped.

The present invention deals with this problem by continually subjecting the submerged portion of the aluminum to a washing action of fresh hot steel so that a thickened layer never has a chance to form and so that any layer of aluminum oxide formed is continually broken so that the molten aluminum can diffuse throughout the steel.

Steel, when it is poured into the ingot mold, is of course immediately chilled by the cool bottom of the ingot mold and then by the cool sides of the ingot mold as the steel rises therein. This chilling quickly thickens a layer of molten steel both at the bottom and adjacent the sides of the ingot mold. If the aluminum, either in solid or molten globule form, enters the thickening layers at the sides of the mold, there is a cumulative cooling effect on the steel and metallic inclusions in the final ingot are impossible to avoid in the absence of other undesirable expedients, such as mechanical stirring. These thickening layers also trap any aluminum oxide scum forced under the surface by the continuing stream of steel from the ladle making it imperative to reduce the formation of scum.

The present invention deals with this problem by adding the aluminum so that the melting action takes place at a distance from the sides of the ingot mold and by so controlling the rate of melting that large globules of molten aluminum are not formed.

Heretofore aluminum has been added to the ingot mold in the form of shot, ingots, or cylindrical bars. Ordinarily, shot is shoveled into the ingot mold during the course of the pour, or placed in bags and thrown into the mold in amounts as determined by the appearance of the steel to the pouring deck superintendent or in amounts as predetermined by the metallurgist. Ingots are thrown in either individually or in bundles. In either case, the shot or ingots float partially submerged on the surface but free to move around.

In some cases, the impingement of the stream of molten steel into the ingot molds will force some of the shot or ingots below the surface of the steel. Some of this shot or ingots is trapped in the thickening layers of steel adjacent to the sides of the mold and does not dissolve. It thus appears as inclusions in the final ingot.

Cylindrical bars are either thrown into the ingot mold during the pour, positioned kitty-corner in the ingot mold prior to the pour or hung over the sides of the ingot mold.

When thrown in during the pour, the bars assume an angular position like a stick in a barrel, with the lower end submerged a distance in the molten steel sufficient to buoyantly support the bar and usually projecting into the thickening layer of steel at one side of the ingot mold. The aluminum is again trapped in the form of globules in the thickening steel and cannot dissolve.

If the bar is positioned kitty-corner in the ingot mold prior to the pour the result is somewhat similar, only in this case, inclusions result in the bottom of the ingot mold as well as along the sides thereof.

Using bars in the above manner, in some instances the end of the bar will melt off to the point where the length of the bar is less than the width of the ingot mold. The bar then floats to the surface and melts in a manner similar to the shot or ingots or is thrown against the sides and is trapped in the thickening layers.

If the bar is hooked over the side of the ingot mold, it is then parallel and close to the sides of the mold and the dual cooling action of the bar and the sides of the ingot mold result in the accelerated thickening of the steel and the trapping of globules of aluminum in the thickened steel. Also if the bar does not melt off sufficiently fast, it becomes buoyant and floats to the surface.

A further problem of cylindrical bars, however, has been in forcing the bar to melt and diffuse notwithstanding the low melting temperature of aluminum and the elevated temperatures of the molten steel. I am advised by one large manufacturer of steel that the largest bar they had previously been able to successfully melt with a 72 inch per minute fill rate weighed about 2 pounds per foot and had a diameter of 1½ inches. Any efforts to exceed this weight resulted in the failure of the bar to melt at all and in some instances it was found possible to pull the bar out of the surface of the ingot after it had hardened, like removing a sword from its scabbard. The reasons for this are not apparent but it is believed the layer of aluminum oxide formed a closed container around the bar inside the layer of thickened steel which prevented the continued flow of heat into the bar or if the aluminum melted, the layer prevented the aluminum from coming into physical contact with the steel. With high carbon steel even a ¾" bar would not melt.

With bars weighing but 2 pounds per foot, it has been heretofore impossible to use a single bar and add the required amount of aluminum to the ingot mold. Thus with a bar weighing 2 pounds per foot and an ingot mold 6 feet in height, it has been possible to add a maximum of about 12 pounds of aluminum for each bar employed. If a plurality of bars were employed, other difficulties immediately arose, such as unpredictable and non-uniform amounts of residual aluminum, unusually high amounts of inclusions and an increased inefficiency of use of the aluminum.

As will appear, the present invention provides a bar having such a weight per foot that a single bar can provide the required total amount of aluminum and such single bar will readily melt and dissolve in the steel without producing inclusions.

It has heretofore been conventional to add about four to five pounds of aluminum to each ton of molten steel the exact amount depending on the amount of oxygen left in the steel by other deoxidizers e.g. silicon and manganese, and the residual desired.

Depending on individual mill practices, from 75–100% of this has been added to the ladle with the balance, if any, to the ingot mold. Using the present invention and for the same residual, the amount of aluminum required per ton of steel can be reduced to from two to three pounds, a rather startling savings, with from 50–100% being added in the ingot mold.

Because of the inefficiencies of the use of aluminum of these prior methods, it has heretofore been extremely difficult if not impossible to accurately predict the amount of residual aluminum which will be found in the final ingot. This follows because it is never known how much of the aluminum would burn on the surface of the ingot or how much would remain dispersed throughout the ingot in the form of undissolved globules.

A still further difficulty has been the inability to obtain a uniform distribution of the residual aluminum throughout the ingot. Normally excessive variations will occur from the top to the bottom and from the core to the sides of the ingot. The present invention now enables the residual to be accurately predicted and the residual throughout the ingot will vary within one or two hundreths of a percent.

In the manufacture of steel, it is expected that certain portions of each ingot will produce an unsalable grade of steel and must be therefore cropped off following the initial slabbing operation or cut from the final strip and returned to the furnace as scrap for remelting. Part of this scrap results from the inclusions above referred to as well as from a pipe which always forms on the interior of each ingot as the steel shrinks during hardening. This pipe usually extends a substantial distance downwardly into the ingot. If the surfaces of the pipe are clean and free of oxides, subsequent rolling operations will, weld the surfaces together and the pipe will cause no problem. The present invention helps to keep the surfaces of this pipe clean by protecting it from the atmosphere. Thus with the present invention, it has been found possible in one large steel mill to reduce the amount of cropping following the initial slabbing or blooming operation from 20 to 15 percent. Further, it has been found possible to increase the total amount of salable steel from any one ingot of so-called "killed" type from the prior practice of a maximum of 50–60 percent to a minimum of 70 percent of the original ingot. The net result is that from each 20 ton ingot, there may be produced an additional 2 or more tons of salable steel over prior practices.

It is to be further noted that the present invention provides a method of adding aluminum to steel whereby it can be added in sufficiently large amounts and with proper diffusion of the aluminum throughout the steel that it is now possible to add all of the aluminum in the ingot mold and none in the ladle. Thus it is possible to produce from a single ladle alternate ingots of rimmed steel and killed steel.

The present invention thus contemplates means and method for adding aluminum to steel as it is being poured into the ingot mold or like container which overcome all of the above referred to difficulties and others, is simple and economical to use and produces unbelievable savings in the steel manufacturing operation.

In accordance with the broadest aspect of the invention an elongated bar of the material to be added to the steel is positioned in an ingot mold prior to the pouring of the steel thereinto so as to be substantially spaced from the sides and ends of the mold, with its longitudinal axis vertical, the arrangement being such that it will remain in such position throughout the entire pour and the steel is poured without the stream contacting the bar.

It is believed that this single feature is a significant advance in the manufacture of steel and that it contributes very substantially to successful melting and diffusion of the aluminum throughout the steel.

In a slightly narrower aspect, the bar is equally spaced from the sides of the ingot mold and is located closer to one end of the mold than the other so that the stream of steel from the ladle will not contact the bar prior to becoming part of the pool of metal in the mold. Also the lower end of the bar prior to pouring will be spaced from the bottom of the mo'd and the upper end of the bar will be located below the ultimate fill level of the steel at the end of the pour.

The bar may be supported in the ingot mold in any desired manner, but in the preferred aspects of the invention the bar will be suspended from the upper ends of the ingot mold in a manner as to either restrain or limit the movement of the lower ends of the bar towards the sides of the ingot mold and preferably should resist, at least to some extent, any upwardly buoyant forces on the bar due to the submergence of the lower end.

The bar, in being suspended in the ingot mold, can move around slightly in the turbulent pool of the molten steel and such motion helps to break up any crust or sheaths of thickening steel or aluminum oxide which might otherwise tend to form around the end of the bar under the surface of the molten steel.

Further in accordance with one aspect of the invention, there is provided an arrangement for supporting an elongated bar in an ingot mold comprised of a bar having a transverse opening through the upper end. A V-shaped member has a portion at the apex extending through the transverse opening and the ends of the legs extending upwardly and outwardly over the upper end of the ingot mold. These ends may be tied to external surfaces on the mold. The member may also be in close proximity to the sides of the bar above the opening so as to give the bar a lateral stability.

The bar in accordance with more limited aspects of the invention has a greater width than thickness and in such instance the wider side of the bar is positioned parallel to the sides of the ingot mold or alternatively one longitudinally extending end, i.e. the narrower side of the bar points toward but is spaced from the stream of molten metal into the ingot mold. Such positioning results in a greater stability of the bar preventing the lower end from swinging into the thickening layers of steel at the sides of the mold.

Furthermore, by supporting the bar in the ingot mold in accordance with the invention, the lower end of the bar will always be held by its own weight below the rising surface of the molten steel a distance determined solely by the melt-off rate of the aluminum which in turn may be controlled by properly proportioning the surface areas of the bar.

In this respect, the broad method of supporting the bar in accordance with the present invention, may be distinguished from the prior practice of simply throwing a bar into the ingot mold. Here, the lower end of the bar will be forced substantial distances downwardly into the molten steel by the weight of the bar above the surface which is opposite to the teachings of this invention. Also the bar is free to move around which is also opposite to the teachings of this invention.

The method of supporting may also be distinguished from hooking a bar over the side of the ingot mold where the steel is subjected to the simultaneous cooling effect of the mold walls.

While of course it is impossible to examine, because of the great heat involved, exactly what is happening below the surface of the molten steel, it is believed that a further important part of the present invention is that the lower end of the bar will be submerged from 1 to 6 inches, and preferably about 3 inches, below the surface of the molten steel. The steel in the upper portions of the molten pool and particularly in the center will be in violent agitation due to the continued addition of steel thereinto. This violently agitated steel around a relatively fixed bar end not only washes away any thickening layers of steel about the bar end but washes the aluminum away from the bar end as fast as it melts and before the aluminum oxide layer can form, or if it does form, to continually rupture it to allow the molten aluminum to contact the steel. It is like spraying a mist of aluminum below the surface of the steel. Large globules of aluminum do not have a chance to form. The aluminum is dispersed uniformly throughout the entire ingot.

It is believed that the steel more than 6 inches below the surface of the pool is beginning to thicken or may have generally reached a quiescent state. Unless the lower end of the bar has been completely melted prior to this much submergence, there will be an increase in inclusions.

Also by limiting the submergence of the bar end, the side forces developed tending to make the bar sway toward the sides of the ingot mold are substantially reduced.

A further advantage of controlling the melt-off rate of the bar so that the melting is completed within a short distance of the surface is that any aluminum oxide particles formed, which are small, will have time to float to the surface before the steel has had time to congeal.

The distance the lower end of the bar is submerged during a pour appears to be proportional to a number of different factors, such as: whether the steel is either of the rimmed or killed type, the rate of rise of the steel in the mold, its temperature, and the side surface area of the bar per pound of aluminum. In accordance with the present invention, the last is proportioned to the former factors (which are usually fixed by individual mill practice) to provide a melt-off rate of the bar such that its lower end will be the desired distance below the surface of the steel.

Steel is ordinarily poured into an ingot mold of a size such that the final ingot will have a weight of between 10–20 tons. Such molds have a vertical height of around 4 feet for the lighter weight ingots up to 8 feet for the heavier ingots. The amount of aluminum which must be added is generally in the neighborhood of from 1 to 1.5 pounds per ton of steel. The bars will normally have a maximum length at least 1 foot shorter than the maximum height of the ingot mold. Thus in order to add the desired amount of aluminum to the ingot mold, the bars must have a weight per foot in excess of 2.80 pounds per foot and preferably 3 pounds per foot for the small ingots and in excess of 4 pounds per foot for the larger ingots.

The maximum weight per foot has not been determined but for the purposes of defining the invention may be taken as 7 pounds. Weights beyond this are impractical to use and result in an unduly short bar in relation to the ingot mold height. Also for the purposes of defining the invention a minimum length of the bar may be taken as 3 feet while the maximum length is 10 feet.

The temperature of the molten steel will vary from heat to heat and from the beginning of a pour into the first ingot to the end of the pour into the last ingot. The surface areas per pound of aluminum indicated hereinafter will be for an average temperature of pour of about 2900° F.

Various steel mills have adopted various rates of rise of the steel in the ingot mold, such rates, in the mills in which the present invention has been tested, varying from 120 inches per minute down to 52 inches per minute. Other rates of rise may be employed if the principles of the invention are followed.

For a fill rate of 120 inches per minute, the optimum side surface area of the bar for a melt-off rate to give the desired submergence is (neglecting the cross-sectional area at the bottom) 31 square inches per pound of aluminum. For a fill rate of 72 inches per minute, the optimum side surface area is 27.5 square inches per pound of aluminum. For the 52 inch fill rate, the minimum surface area is 25 square inches per pound of aluminum, it being assumed that in each instance the bar is suspended as hereinbefore described in accordance with the invention. Also for these slower fill rates, bars with a greater weight per foot should be employed. Melting of the bar can of course be obtained using surface areas per pound of aluminum below that above indicated, but in such cases the lower end of the bar has excessive submergence and then tends to chatter or sway violently in the ingot mold as the steel is poured.

Surface area per pound of aluminum may be increased over that above indicated by amounts of approximately 20 percent, the result being that the lower end of the bar will have less submergence. The maximum surface area which may be employed is that which results in the lower end of the bar melting just at or slightly above the surface of the molten steel. In such case, the molten aluminum floats on the surface of the molten steel and burns. It will be appreciated that the phenomenon of the lower end of the bar being above the surface of the steel is possible because of radiated heat from the molten steel.

Thus in accordance with the invention, there is provided an article of manufacture for deoxidizing and alloying of steel with aluminum comprised of a bar of aluminum having a length of from 3 to 10 feet, a weight per foot of from 2.80 to 7 pounds and a side surface area of from 25 to 35 square inches per pound of aluminum. Further such bar has a transverse opening at one end.

Further in accordance with the invention, a method of deoxidizing and alloying of steel with aluminum is provided, comprising: providing a bar of such metal having a weight per foot in excess of 2.80 pounds, positioning same in an ingot mold so as to be generally equally spaced from the sides thereof, and adjusting the surface area of the bar per pound of metal in the bar in relation to the rate of fill of the steel into the ingot mold such that the lower end of the bar will be submerged a distance of between 1 to 6 inches below the surface of the molten steel. For optimum performance the surface area as related to the rate of fill may be approximately defined by the formula: $S.A. = 18 + .123 \times F.R.$ where S.A. is in square inches per pound of aluminum and F.R. is in inches per minute and is not less than 40.

It is to be noted that this increase in surface area cannot be obtained by longitudinally notching the surface of the bar or by providing wings or lobes on a round bar. Such longitudinal notch is sharp angled and traps the crust or congealing steel which then impedes the further melting and diffusion of the aluminum into the molten steel. Thus the bar should have a generally smooth exterior surface. Any surface angles less than 180° are preferably gradual sweeping curves. In accordance with one aspect of the invention, the bar has a generally oblong cross sectional shape with a maximum width to minimum thickness ratio of at least 2½ to 1. The minimum angle between remote portions of a side should be 135°.

The cross sectional shape of the bar may be generally oblate or rectangular so long as the suspension and/or surface area relationships above referred to are maintained. In actual pouring tests and thus in accordance with a more limited aspect of the invention, an oblate or rectangular bar has a longitudinally extending midsection of lesser thickness than the longitudinally extending end portions. It is believed that this shape is of value in a bar of any weight per foot for the reasons that an improved melting action appears to take place. Thus, if the bar were a flat rectangle, the narrower sides or longitudinally extending ends would tend to melt off more rapidly than the center resulting in a single pointed end below the surface. However, as the midsection is thinned out in accordance with such limited aspects of the invention, the result is an increase in the melt-off rate of the center and a more even melting across the lower end of the bar to a point where the mid-section can be made to melt off more rapidly than the longitudinally extending ends leaving two conical points below the surface. The result is a more rapid rate of increase of surface area below the surface of the steel than the case would be if a rectangular bar were used. A greatly accelerated rate of melting of the aluminum immediately below the surface of the molten steel results.

Another possible reason for the success of the thinner midsection is that a surface contour below the surface of the molten steel is provided having reverse curves therein so that stresses are introduced in the aluminum oxide layer which forms sufficient to continually rupture the layer so that the molten aluminum can get through to the steel. In this respect it is to be noted that the aluminum oxide layer has a very high surface tension which would at all times be attempting to straighten out the reverse curve. Thus, the surface tension on the reverse curve continually ruptures the aluminum oxide layer. If this is so, reverse curves formed in other ways such as by corrugating or dimpling the surface of an oblate or rectangular cross section bar should operate.

The principal object of the invention is the provision of a new and improved means and method for adding light weight low melting temperature metals to heavier higher melting temperature metals as it is being poured into an ingot mold which is simple to employ, substantially increases the amount of salable metal from each ingot, produces less and a cleaner slag on the top of the ingot, results in less metallic inclusions in the ingot, results in a shorter pipe or a pipe which is sufficiently free of slag that the pipe will weld together during a subsequent rolling operation, and requires less of the lighter metal with the same equivalent results, enables accurately predicting the amount of residual alloy.

Another object is the new and improved means and method for adding aluminum to steel which results in less scrap in the final rolled strip.

Another object is the provision of a new and improved means and method for adding aluminum to steel which enables killed and rimmed steel to be produced from the same ladle.

Another object of the invention is the provision of a new and improved means and method for adding aluminum to steel which enables all of the aluminum to be added in the ingot mold and makes it unnecessary to add aluminum to the ladle.

Another object is the provision of a new and improved means and method for adding aluminum to steel wherein a bar having the necessary weight per foot to add the desired amount of aluminum to the ingot is suspended with its long axis vertical in the ingot mold in a manner such that the bar will not tilt or float to the surface of the molten steel being poured and so that the lower end of the bar is submerged a controlled distance below the steel.

Another object of the invention is the provision of a new and improved method and means for adding aluminum to steel as it is being poured into the ingot mold which enables the amount of residual aluminum to be accurately predicted and also enables the obtaining of uniform aluminum residuals throughout the entire ingot.

Still another object of the invention is the provision of a new and improved means and method for adding aluminum to steel as being poured into the ingot mold which enables the aluminum to be added at a uniform rate to the molten steel during substantially the entire pour of the steel and which uses the rising surface of the molten steel to protect the melting aluminum from burning in the atmosphere.

The invention may take physical form in certain parts and arrangement of parts and steps and combinations of steps the preferred embodiment of which will be described in detail in this specification and illustrated in the accompanying drawings which form a part hereof and wherein.

Figure 5a is a fragmentary side elevational view of Figure 5 on the line 5a—5a;

Figure 1:
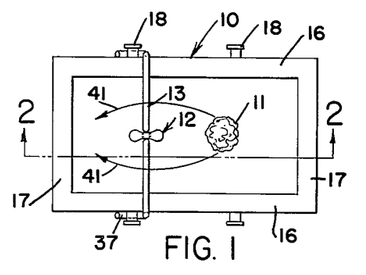
Figure 1 is a top elevational view of an ingot mold with a stream of steel flowing thereinto and with a bar shaped and horizontally positioned in the ingot mold in accordance with a preferred embodiment of the invention.
Figure 2:
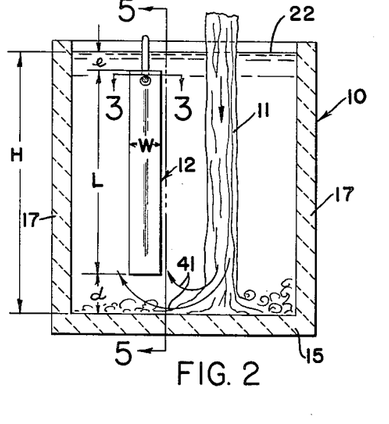
Figure 2 is a side cross-sectional view of Figure 1 showing the preferred vertical positioning of the bar.

Referring now to the drawings wherein the showings are for the purposes of illustrating a preferred embodiment of the invention only, and not for the purposes for limiting same, Figures 1 and 2 show an ingot mold 10 with a stream of steel 11 flowing thereinto and with an elongated bar 12 suspended therein by means of a hanger 13 for the purpose of deoxidizing the molten steel as it rises in the ingot mold and for alloying such steel with the metal of the bar 12.

The ingot mold 10 per se forms no part of the present invention and is comprised generally of a bottom 15, sidewalls 16, and end walls 17 constructed in a manner as is conventional in the steel making art. Thus the walls 16, 17 may have any desired horizontal dimension as is known and may have a vertical height as desired, all depending upon the size of the individual ingot which is to be cast therein. Ordinarily, such ingot molds have a height of approximately 72 inches and such a dimension will generally be assumed for the purposes of describing the preferred embodiment. The width and thickness dimensions are varied for various size ingots.

The stream of molten steel 11 is allowed to flow into the ingot mold 10 to form a pool of molten metal 20, the upper surface 21 of which rises in the ingot mold at a fill rate determined by the diameter of the stream 11 and the horizontal cross-sectional area of the ingot mold. Normally the steel will have a top or fill line 22 adjacent the top of the ingot mold. If desired, a hot top as is conventional in the art, may be employed. Such hot top would be positioned on top of the ingot mold as viewed in Figure 2 and is normally provided for the purposes of reducing the formation of a pipe.

The temperature of the steel flowing into the ingot mold is normally around 2900° F. and the fill rate in the ingot mold will vary depending upon the individual steel mill practice. The fill rate may be as desired, but for most steel mills, is approximately 60 to 72 inches per minute. Other fill rates may be employed.

The sides 16, 17 are normally formed of a refractory material capable of withstanding the high temperatures of the molten steel and normally cold at the beginning of each pour Thus the stream of steel 11 as it initially flows into the ingot mold 10 is rapidly chilled by the bottom 15 of the ingot mold. This steel quickly thickens due to its chilling. As the molten steel rises in the ingot mold, the heat of the steel is conducted rapidly to the walls 16, 17 and is likewise rapidly thickened to form a layer indicated generally at 19 parallel to the walls which consist of steel either in a congealed or partially congealed state due to these rapid cooling effects.

The steel 11 may be either killed or rimmed steel, although the invention primarily pertains to killed steel. Thus rimmed steel as it cools in the ingot mold rapidly evolves gasses which cause a rapid circulation of the metal in the ingot mold while the killed steel lays quiet with little activity except to the stirring action caused by the ever falling stream 11 of new metal.

The bar 12 can be of any metal having a lower melting temperature than the metal in the ingot mold which itself may be other than steel. Preferably the bar is of 99% aluminum.

The bar 12 is generally elongated, its length in conjunction with its cross-sectional area determining its weight and thus the amount of metal to be added to the molten steel. The invention deals particularly with controlling the cross-sectional shape of the bar to obtain the optimum surface area per unit weight of aluminum per unit rate of rise of the steel in the ingot mold and in the broad aspects of the invention may have any shape so long as the required surface area is maintained.

Figure 3:
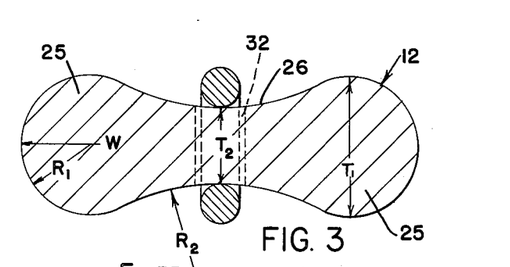
Figure 3 is a fragmentary cross-sectional view but greatly enlarged taken approximately on the line 3—3 of Figure 2 and showing in detail the cross-sectional shape of a preferred embodiment of the bar.

In slightly narrowed aspects the shape is also important and in the preferred embodiment shown, the cross-sectional shape is generally that of a dumb-bell so that the bar includes a pair of spaced, longitudinally-extending portions 25 of a transverse thickness T–1 inter-connected and integrally joined by an intermediate web portion 26 of a transverse thickness T–2 less than T–1.

Further in accordance with the preferred embodiment of the invention, the portions 25 have a convex external surface having a radius R–1, while the web portion 26 has a convex external surface with a radius R–2, all as will appear hereinafter.

While only one thin mid-section is shown, the bar in broader aspects of the invention may have one or more thin section spaced from the edges. The side surfaces would appear then to be corrugated either symmetrical to each other or otherwise. Also the curved surfaces can presumably be replaced by flat surfaces properly angled one to the other.

The bar 12 is positioned in the ingot mold with its longitudinal axis vertical and with its sides substantially spaced from and parallel to the walls 16, 17 so that the chance of the bar coming into contact with or being submerged in the thickening layer 19 adjacent the ingot walls, is as small as possible.

Thus in the preferred embodiment, the bar 12 is equally spaced from the side walls 16. The spacing from the end wall 17 should be as large as possible for the same reasons as the spacing from the side walls. However, in this case it is desirable and necessary to leave room for the stream of steel 11 into the ingot mold and for this reason, the preferred embodiment spaces the bar from one of the end walls 17 a distance approximately equal to one third to one half the width of the ingot mold. It is to be noted that if the stream 11 should contact the bar 12, there is danger of it cutting off the lower end of the bar with the result that this lower end will then float on the surface 21 of the molten metal and melt and burn in the atmosphere.

It is believed that I am the first to ever appreciate the need for so positioning a bar of any shape in an ingot mold.

As indicated, the steel when it first contacts the bottom 15 of the ingot mold is rapidly chilled. For this reason the lower end of the bar 12 is preferably spaced a distance $d$ from the bottom 15 of between 3 to 12 inches.

In a like manner, the upper end of the bar 12 is spaced a distance $e$ below the fill line 22 between 6 to 18 inches. There is no reason why the bar 12 cannot extend above the fill line 22 but in this instance the metal of the bar 12 above the fill line 22 will not be consumed or if consumed, will be wasted.

The bar 12 is suspended or positioned in the ingot mold so as to be restrained from vertical movement, either downwardly under the force of gravity, or upwardly under the buoyant forces of the molten steel on the submerged end 30, the weight of the bar itself resisting these buoyant forces.

Such suspension means may take a number of different forms, but in the preferred embodiment of the bar has a transverse opening 32 through the web portion 36 generally on the center line of the bar and closely adjacent to the upper end of the bar.

Figure 5:
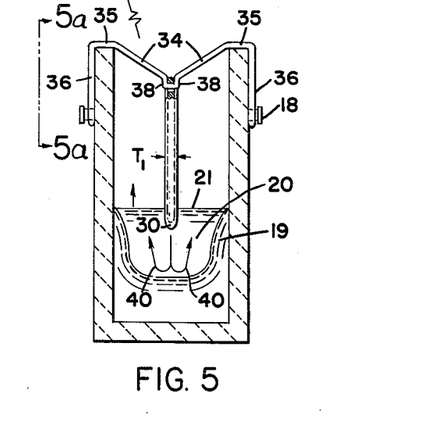
Figure 5 is a cross-sectional view of Figure 2 taken approximately on the line 5—5 thereof, but showing the ingot mold partially filled with molten steel and also illustrating in some detail a preferred method of suspending the bar in the ingot mold.
Figure 5A:
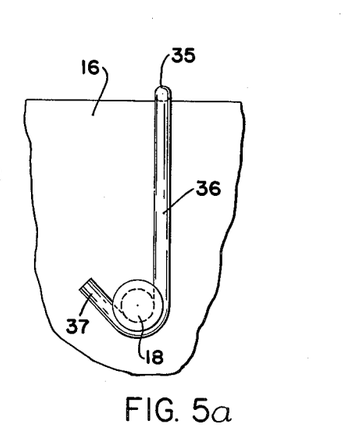

The hanger means 13 coact with this opening 32 to suspend the bar 12 in the desired position. These hanger means in the preferred embodiment are comprised of a rod of steel or aluminum in the shape of a V, including an apex 33 positioned in the opening 32 and a pair of legs 34 diverging upwardly and outwardly and thence horizontally as at 35 across the upper ends of the side walls 16. Preferably the wire beyond the outer surfaces of the side wall 16 is bent over as at 36 and thence around hold down means such as lugs 18 as at 37. Eyelets may also be employed through which the legs extend and are bent upwardly. With this arrangement the bar 12 is firmly supported in the ingot mold. An eyelet, and other hold down means for the hanger means, are described and claimed in my co-pending application, Serial No. 673,414, filed July 22, 1957.

If the lugs or eyelets are not a part of the ingot mold, they may be welded to the sides. Some means for tying down the wire is usually but not always necessary.

In the embodiment shown in Figure 5, the wire immediately adjacent the apex 33 extends vertically upwardly as at 38 for short distance in close spaced relationship to both sides of the web portion 26 above the opening 32. These portions 38 provide a degree of lateral stability to the bar 12 preventing any sideward sway of the bar as the steel is poured into the ingot mold. It will be appreciated that the lower end 30 is submerged below the surface 21 which is in violent agitation and this violently agitated steel will exert substantial forces sidewardly on the bar 12. The hanger means help to prevent this.

In this respect, however, it is to be noted that with the positioning of the width of the bar 12 parallel to the side walls 16 and by positioning the bar 13 closer to one end wall 17 than the other and by pouring the steel closer to the other end wall, the currents of agitated steel in the ingot mold tend to exert the minimum force on the bar 12 tending to make it move from the vertical position shown.

Thus as is seen in Figure 5, if the stream of steel into the ingot mold is on the center plane between the side walls 16, symmetrical convection currents 40 will be set up so that the forces exerted on opposite sides of the bar 13 by the currents 40 will be generally equal and will thus offset each other.

On the other hand, as viewed in Figure 2, in order for the steel to flow into the space on the side of the bar remote from the stream of steel, there is a substantial unidirectional horizontal movement as indicated by the currents 41, and these currents will tend to move the bar 12 toward the end wall remote from the stream of steel. However, because the surface area of the bar 12 presented to these convection currents is held to a minimum in accordance with the invention, the movement of the bar toward the end wall 17 is held to a minimum.

To install the bar 12 as is shown in Figure 5, the wire to form the hanger 13 is first threaded through the opening 32 and the wire is then bent upwardly so that both legs generally parallel each other. Thereafter, they are bent outwardly to form the legs 34 and then when the bar 12 is positioned in the ingot mold, the wire is bent to form the portions 35, 36. It is to be noted that the angle between the legs 34 and the length of these legs will determine the vertical positioning of the bar 12 in the ingot mold.

Figure 6:
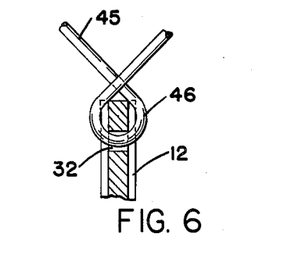
Figures 6, 7 and 9 are alternative embodiments of arrangements for suspending the bar in the ingot mold.

Other means may be employed to suspend the bar 12 in the mold. For example, a pair of wires could be welded to the upper end of the bar. Alternatively, in Figure 6, a wire 45 is threaded through the opening 32 and each end is bent through an angle of approximately 135° to form a loop 46 at the apex of the V.

Figure 7:
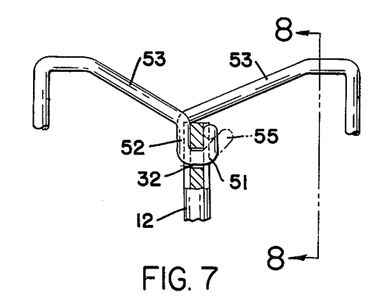
Figure 8:
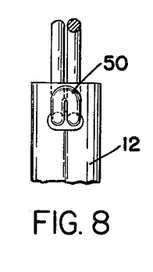
Figure 8 is a fragmentary view of Figure 7 taken approximately on the line 8—8 thereof.

Figure 7 shows a further alternative arrangement wherein a length of wire is doubled upon itself as at 50 and then this doubled end is shaped into a hook 51 which extends through the opening 32. The two free ends of the wire then extend vertically upwardly as at 52 for a short distance and then diverge as at 53 to the upper ends of the side walls 16. This arrangement is of value in that it does not require the wire to be threaded through the opening 32 which in some instances can be a laborious process. In Figure 7 the end of the hook 55 is shown in dotted lines as extending outwardly at an angle. This facilitates the insertion through the opening 32. Thereafter either by means of a sledge hammer or otherwise, the end 55 can be bent close to the sides of the bar above the opening 32 as is indicated in the solid lines.

Figure 9:
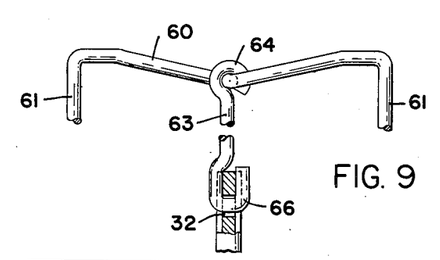

Figure 9 shows a still further alternative embodiment wherein a single transverse wire 60 having hook portions 61 to fit over the outer sides of the ingot mold are provided. A second wire 63 fastened to the center of the wire 60 by means of an eye 64 or by other suitable means such as welding, extends vertically downwardly therefrom and has a hook 66 on the lower end which extends through the opening 32.

Figure 11:
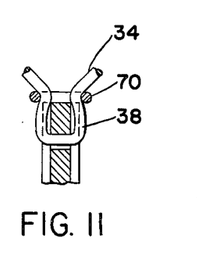
Figures 11 and 12 are fragmentary views of alternative arrangements for hanging the bar.
Figure 12:
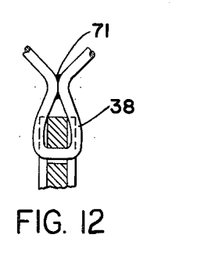

In Figure 11 an oval shaped ring 70 is dropped over the legs 34 and forced toward the top of the bar 12. It pinches the portions 38 against the sides of the bar and in some instances rests on the end of the bar resulting in greater stability of the bar during the pour. The legs 34 are bent outwardly from the ring using it as a fulcrum. Figure 12 shows the portions 38 crimped over the upper end of the bar and spot welded as at 71.

Figure 4:
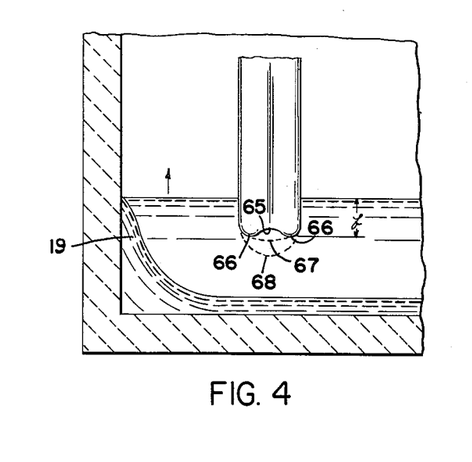
Figure 4 is a fragmentary view somewhat enlarged of an ingot mold partially filled with molten steel and illustrating in solid lines how it is believed the lower end of the bar of the preferred embodiment melts off as the steel rises and in dotted lines how the lower end of the other shapes of bars will melt off.

In operation, a bar 12 is positioned in each of an entire series of ingot molds prior to the pouring of steel thereinto. Steel is then poured into the ingot mold as is shown in Figure 2 from a spout on a ladle (not shown) using care that the stream does not contact the bar. The first steel strikes the ingot mold bottom and congeals relatively rapidly. Thereafter the steel commences to rise in the ingot mold as is shown. The lower end of the bar is first heated somewhat by radiation from the red hot steel. As soon as the surface 21 of the steel contacts the lower end of the bar, the heat transferred to the bar is much more rapid and the bar commences to melt off. Because there is less metal in the web portion, the melt-off rate here is accelerated, which melt-off rate may be controlled by adjusting the thickness T-2. Thus, as the thickness T-2 is made less and less, it is believed the lower end of the bar in side view will assume a concave shape generally as shown at 65 with a pair of points 66 on each side thereof. As the web T-2 is thickened, the point 65 will gradually become flush with the points 66 as indicated by the dotted line 67 and if it is brought up to the same thickness as T-1, the bar will have a point as indicated generally by the dotted lines 68.

This non-uniform melting appears to assist in rupturing the oxide film which normally forms around aluminum and which has heretofore prevented or made difficult the melting and diffusion of more conventional shapes. The oxide film has a very high surface tension and tends to force the molten metal into a round shape. With the shape of the preferred embodiment the tendency is to form two spaced cylinders and the force between these two cylinders finally exceeds the tensile strength of the film and ruptures it. Once the film is ruptured, the molten aluminum can freely mix with the steel.

Obviously, the side surfaces can be flat surfaces which meet at an angle at the midsection, but if so, the angle between such surfaces should be large, possibly between 135 and 175 degrees.

Also, only one surface need have such concave curvature, or the rupturing effect of the oxide film can be obtained by dimpling the surface of the bar by a plurality of concave recesses positioned along its length. Alternatively, one or both sides of the bar can be corrugated.

The shape shown with both sides of the bar being concave has proven satisfactory in practice, and is in accordance with slightly more limited aspects of the invention.

The shape is believed so effective in rupturing the film as to be workable with the bar positioned in accordance with prior methods. Positioning as above described is preferred.

Once the film is broken, the immediate upper layers of the molten steel adjacent the surface 21, which are violently agitated, tend to wash off each particle of the bar 12 as it reaches the molten state. The molten bar 12 thus enters the steel in a very fine droplet or even spray form. Because of the very small amount of submergence of the bar 30, the metal immediately inwardly of the surface retains its strength and does not become softened whereby an entire plastic mass might break off from the lower end of the bar 12 to float around in the molten steel like a ball separated from the steel by an oxide coating. There is a continuous, controlled and uniform addition of aluminum to the steel during substantially the entire pour. Each inch of steel is immediately and uniformly mixed with aluminum. Uniform residuals result.

Thus, in accordance with the invention, the lower end of the bar 12 must be submerged below the rising surface 21, but must not be submerged excessively. It is believed that a distance of 3 inches is optimum, 6 inches is maximum, and 1 inch is minimum.

The amount of submergence depends on the relationship of the rate of rise of the surface 21 to a number of factors all dependent on the initial side surface area of the bar which in accordance with the invention are so proportioned to give the desired submergence.

As each mill has its own rate of fill, normally the surface area of the bar per pound of aluminum is adjusted so as to control the amount of submergence of the lower end.

Figure 10:
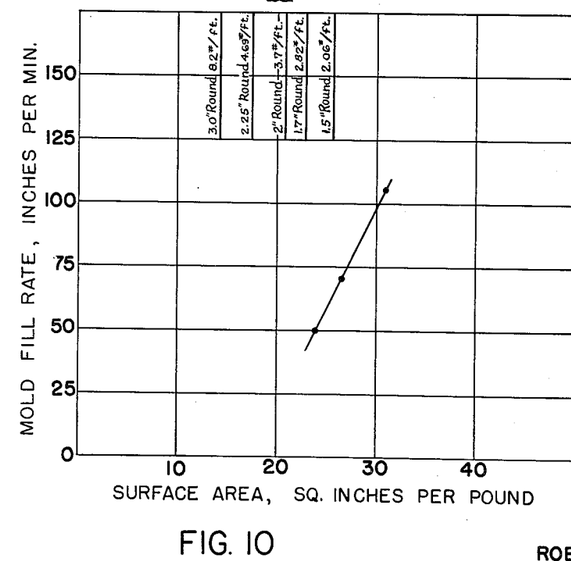
Figure 10 is a graph showing the relationship of preferred surface areas per pound of aluminum to the ingot mold fill rate.

There is an optimum surface area for each rate of rise which is shown on the graph of Figure 10 wherein the rate of rise in the ingot mold is plotted against surface area per pound of aluminum of the bar. In accordance with this graph, a rate of rise of 52 inches per minute requires a surface area of approximately 25 square inches per pound. A fill rate of 72 inches per minute requires a surface area of approximately 27 square inches per pound, and a rate of rise of 110 inches per minute requires a surface area of 31 square inches per pound for optimum results.

It is normally necessary to add from 15 to 25 pounds of aluminum to a 72 inch ingot mold, and the maximum length of the bar will be between 4 to 5 feet in length. If a single bar 12 is to be employed, it must then have a minimum weight per foot of from 3 to 4 pounds, and a maximum weight per foot of from 5 to 6 pounds. Reference to the graph, wherein the weights per foot of round, cylindrical bars have been superimposed, will show that for fill rates greater than 72 inches per minute, which is a widely used rate throughout the steel industry, a round bar of these weights is unsatisfactory. A bar having a surface area greater than that of an equivalent cross-sectional area round bar must be employed. Such surface areas, in accordance with the invention, are obtained by adjusting the cross-sectional shape of the bar to increase its perimeter while holding the cross-sectional area constant.

Otherwise stated, the cross-sectional area of the bar should permit of a thermal conductance capacity between a minimum thermal conductance capacity in excess of the capacity of the molten metal to transmit heat to the very end of the bar so that the end of the bar will be submerged throughout the pour, and a maximum thermal conductance capacity less than the capacity of the molten metal to transmit heat to the entire submerged portion of the bar so that solidification of the molten metal about the submerged portion will not take place.

From the graph shown in Figure 10, the optimum surface area of the bar as related to the rate of fill may be approximately defined by the formula $S.A. = 18 + .123 \, F.R.$ where S.A. is in square inches per pound (neglecting the end cross-sectional area) and F.R. is in inches per minute.

It is believed that the method of positioning the bar in the ingot mold and of proportioning the surface area of the bar per pound of aluminum in relation to the rate of rise of the steel in the ingot mold so that the lower end will be submerged a controlled distance below the rising surface of the steel, is a new and decided advance forward in the manufacture of killed steel, and that this alone contributes substantially to the improved results obtained in steel making.

It is believed that the thin midsection also contributes to these desirable results by providing a shape that inherently causes any aluminum oxide film that forms to continually be ruptured so that the molten aluminum can flow therethrough into the molten steel.

The most suitable shape employed to date utilizing high purity aluminum bars has had a minimum web thickness T-2 falling between .35 and about .70 times the major cross sectional dimension of the end portions 25, i.e. the diameter T-1. A web thickness T-2 ranging from about .45 to about .55 times the major cross sectional dimension T-1 appears suitable for most applications. With respect to the distance between the geometric centers of the end portions 25, the best results are believed to be obtained when the said distance is greater than about 1.1 times the minimum web thickness and it is contemplated that greater aluminum requirements in the melt may be accounted for by increasing the distance between centers to as high as about eight times the minimum thickness of the web. Present indications are that optimum results are obtained when the distance between centers is from about 1.25 to about 5 times the minimum thickness of the web.

The bar illustrated in Figure 3, in accordance with the preferred embodiments of the invention, has the following approximate dimensions for the stated fill rates:

| | | |
|---|---|---|
| Fill rate inches per minute | 72 | 110 |
| Weight per foot equals | 4.8 | 3 |
| W=inches | 4 | 3 |
| T-1, inches | 1⅜ | 1⅛ |
| T-2, inches | ¾ | ⅝ |
| R-1, inches | 1¹⁄₁₆ | ⁹⁄₁₆ |
| R-2, inches | 2¼ | 1¼ |
| Surface area per pound of aluminum | 27 | 31 |

These dimensions have been found to work satisfactorily for the conditions stated. Obviously they may be varied within limits depending on the weight per foot desired. So far as I know the shape shown is effective and novel for any weight per foot.

Other suitably sized bars may have an end portion dimension T-1 of from 1½" to 1⅛", a minimum web thickness of from ¾" to ⁹⁄₁₆" and a distance between centers of 2½" to 3⅜".

The bar may be either cast, rolled, or extruded aluminum, and is preferably of 99% pure aluminum. It may be of a lesser purity but as the impurities may vary from bar to bar, an undesirable variable may also be introduced. It is of course possible to use the bar for the purpose of introducing small amounts of other elements by alloying them with the aluminum. Obviously the bar may be entirely of any other metal which it is desired to add to the steel. Aluminum is effective and no tests have been run with other metals.

To use the present invention, the metallurgist must first determine the total weight of bar to be positioned in each ingot mold. This will vary dependent upon the amount of residual aluminum desired and the oxygen content of the steel as it is poured in the ingot mold which in turn varies primarily dependent upon the amount of aluminum, if any, added to the ladle. Residuals of .04 to .06 percent are conventional; that is to say, from .8 to 1.2 pounds of aluminum per ton of steel.

Where in prior practices it was conventional to add all of the aluminum in the ladle and the metallurgist desires to continue this practice, the weight of the bar or bars per ton of ingot is made equal to the actual residual desired per ton of steel plus 20% to compensate for loss or wastage of aluminum. This amount may be considered basic and additional amounts will be employed as reduced amounts of aluminum are employed in the ladle.

Thus, more preferred practice is to reduce the amount of aluminum used in the ladle by one-third, and then to add 20% aluminum to the above base amount to compensate for the increased oxygen in the steel as it flows into the ingot mold.

In some instances, if the metallurgist desires to reduce the amount of aluminum employed in the ladle to an amount where the steel is just on the point where it will rim, the metallurgist should then add 40% to the base amount to compensate for the increased amount of oxygen.

Where no aluminum is used in the ladle, and the present invention permits of this practice, the amount of aluminum should be increased by 80% over the above base amount.

As it is normally conventional in prior practices to employ from 4 to 5 pounds of aluminum per ton of steel when all of the aluminum is added to the ladle, it will be seen that by using the present invention substantial savings in the total amount of aluminum are possible.

The metallurgist, knowing the rate of fill of his ingot mold, then determines the surface area of the bar per pound of aluminum. This surface area is critical within limits. If it is too large, the lower end of the bar melts off too close under the rising surface of the steel and more of the aluminum is wasted by burning in the atmosphere. If the surface area is too small, the lower end of the bar becomes submerged below the rising level of the steel and a number of objectionable results follow, such as the buoyant effects of the steel on the bar becoming excessive to the point that toward the end of the fill the bar will tend to float to the surface or the submerged end of the bar becoming plastic and losing its strength to the point where globules of aluminum will break off into the molten steel and protected with an aluminum oxide layer either float to the surface or become trapped in the congealing metal leaving large aluminum inclusions. The effect of the bar tending to float to the surface may be counteracted by more rigidly fastening the bar to prevent it from pivoting about its point of suspension and/or by tying the hanger to the sides of the ingot mold as indicated.

The maximum bar length for a 72 inch high mold is approximately 5 feet and the metallurgist must then choose a bar having the desired surface area per pound of aluminum and having a weight per foot such as to give to him approximately the desired amount of aluminum which must be added to give to him the desired results. If such a bar does not provide sufficient weight of aluminum, either a second bar may be employed or the additional aluminum may be added in the ladle.

It has been found that a bar weighing 3 pounds per foot and having a surface area of 31 square inches per pound of aluminum, a bar weighing 4.8 pounds per foot and having a surface area of 27 square inches per pound of aluminum and a bar weighing 6 pounds per foot and having a surface area of approximately 25 square inches per pound of aluminum will take care of substantially all of the standard mill practices in use today. It will be appreciated that the smaller bars are employed with the ingot molds of smaller size, but as this smaller size is accomplished by reducing the horizontal dimensions, the result is that normally with the smaller ingots, a faster fill rate is employed.

It is to be further noted that because the aluminum is added at a uniform rate to the ingot mold as the steel is poured into the ingot mold, and because it is added in such fine particles that almost complete dissolution results and a uniform residual in the ingot from top to bottom and from edge to edge may be obtained without any inclusions either of aluminum or otherwise in the ingot. Consequently, substantially increased yields can be obtained from each ingot and the metallurgist may be assured of the fact that the entire end product from each ingot may be used for the same purpose as distinguished from prior practices wherein only portions of the ingot were as desired and could be employed for their intended use whereas the remainder had to be sold for other purposes.

With wide narrow ingot molds, two spaced bars may be employed, each as above described, and the steel poured into the exact center of the mold.

It is to be noted that using the present invention it is possible to add all of the aluminum in the ingot mold with resultant efficiencies in the use of the aluminum. Normally, however, mill practice will call for adding some of the aluminum in the ladle.

It is believed that I am the first to have appreciated that a bar may be employed for the addition of aluminum to molten steel as it is poured into the ingot mold if the surface area of the bar per pound of its aluminum content is related to the rate of fill of the steel in the ingot mold. It is further believed that I am the first to appreciate the fact that the bar must be suspended on the center plane of the ingot mold in a manner that the bar will always have a vertical axis during the entire pour.

It is further believed that I am the first to appreciate that a bar having a width greater than its thickness, and with a thinner midsection than the edges can be profitably employed for the deoxidizing of molten steel. While it is believed that the invention is applicable to other shapes of bars, it is believed that the shape described gives the optimum results.

The preferred embodiments of the invention described are illustrative of the invention. Obviously modifications and variations differing from the preferred embodiments will occur to others upon a reading and understanding of this specification, but still within the spirit of the invention. It is my intention to include such modification and variations.

This application is a continuation in part of my copending application, Serial Number 621,787, filed November 13, 1956.

Having thus described my invention, I claim:

1. The method of treating steel as it is poured into an ingot mold comprising the steps of supporting an elongated aluminum bar in the ingot mold in such a manner that the sides of the bar are substantially spaced from the sides and ends of the ingot mold and with its longitudinal axis generally vertical and continuously pouring steel into the ingot mold in such a manner that the stream of molten steel does not contact the bar to continuously fill the ingot mold, the side surface area of the bar and the fill rate of the molten steel in the ingot mold being defined by the following approximate relationship: S.A.=18+.123 F.R., where S.A. equals the surface area (neglecting the end cross sectional area) of the bar per pound of aluminum, and F.R. equals the fill rate of the ingot mold in inches per minutes.

2. The method of claim 1 wherein the bar has a weight per foot between 2.80 and 7 pounds, and the minimum fill rate is 40 inches per minute.

3. The method of adding aluminum to molten steel as the steel is poured into an open topped ingot mold having a bottom and spaced side walls comprising the steps of: positioning an elongated aluminum bar in the container in such a manner that the sides of the bar are substantially spaced from the sides of the ingot mold and the longitudinal axis of the bar is generally vertical; and thereafter continuously pouring a stream of molten steel into the ingot mold in such a manner that the stream does not contact the bar and the rising pool of molten steel progressively submerges and melts off the lower end of the bar and the rising pool surface protects the submerged end of the bar from the atmosphere and simultaneously during such pouring, rigidly holding the upper end of the bar in such a manner as to prevent any substantial vertical upward movement of the bar due to buoyant effects on the submerged end or any substantial horizontal movement due to the turbulent impingement of the molten steel in the rising pool.

4. The method of claim 3 wherein said bar is spaced from the sides of the ingot mold a distance approximately equal to one third the maximum spacing between the sides of the ingot mold.

5. The method of claim 3 wherein the bar has a weight per foot in excess of 2.80 pounds and a side surface area per pound of aluminum, neglecting the end cross-sectional area, in excess of 25 square inches.

6. The method of claim 3 wherein the bar in horizontal cross-section has a width approximately at least 2½ times the maximum thickness.

7. The method of adding aluminum to molten steel as the steel is poured into an open topped container having a bottom and side walls comprising the steps of: positioning an elongated aluminum bar in the container in such a manner that the sides of the bar are substantially spaced from the sides of the container and the longitudinal axis of the bar is generally vertical and with the lower end of the bar spaced from the bottom of the container and the upper end of the bar spaced below the plane of the ultimate fill level of the container; and thereafter continuously pouring a stream of molten metal into the container in such a manner that the stream does not contact the bar and the rising pool of molten steel progressively submerges and melts off the lower end of the bar and the rising pool surface protects the submerged end of the bar from the atmosphere.

8. The method of claim 7 wherein the bar has a weight per foot in excess of 2.80 pounds and a minimum thermal conductance thermal capacity in excess of the capacity of the molten metal to transmit heat to the end of said bar and a maximum thermal conductance capacity less than the capacity of the molten metal to transmit heat to the entire submerged portion of said bar.

9. A method of killing steel by the addition of aluminum thereto as the steel is poured into an ingot mold having a bottom and vertically extending sides and ends, comprising the steps of positioning an elongated bar of aluminum in said ingot mold with its lower end spaced from the bottom of the ingot mold and its sides generally equally spaced from the sides of the ingot mold and generally one third of the width of the ingot mold from one end thereof, pouring steel into the opposite end of said mold so as not to strike said bar and allowing the pool of steel to rise around the lower end of the bar and melt it off as the pool of steel rises.

10. The method of claim 9 wherein the bar is spaced generally from one third to one half of the width of the ingot mold from one end thereof.

11. A method of killing steel by the addition of aluminum thereto as the steel is poured into an ingot mold having a bottom and vertically extending sides and ends, comprising providing an elongated bar of aluminum having a cross-sectional shape maximum with a width at least 2½ times the minimum thickness, positioning such bar in an ingot mold with its long horizontal dimension parallel to and substantially spaced from the sides of the ingot mold, and so that the longitudinal axis of the bar extends generally vertically, and pouring steel into said ingot mold so as not to strike said bar and allowing the pool of steel to rise around the lower end of the bar and melt it off as the pool of steel rises.

12. A method of killing steel by the addition of aluminum thereto as the steel is poured into an ingot mold having a bottom and vertically extending sides and ends, comprising providing an elongated bar of aluminum having an elongated cross-sectional shape such that portions of the thickness adjacent each edge are approximately twice the thickness of portions spaced from the edges, positioning such bar in an ingot mold with the longitudinal axis generally vertical and pouring steel into said ingot mold so as not to strike said bar and allowing the pool of steel to rise around the lower end of the bar and melt it off as the pool of steel rises.

13. In a process for deoxidizing molten steel in an ingot mold wherein rapid solidification of molten steel adjacent the bottom and side wall portions of the mold occurs during the filling thereof, the improved deoxidizing process wherein said molten steel is contacted and reacted with deoxidizing metal comprising contacting said molten steel below the surface thereof with an end of an elongated bar composed of deoxidizing metal whereby said bar is consumed through the action with said molten steel during the filling of said mold, said bar, in horizontal cross-section, being elongated and having a relatively thinner middle portion than end portion, being suspended and spaced apart from the bottom and side walls of said mold and further positioned in said mold so that only one of said end portions faces the stream of molten metal filling said mold.

14. The method of claim 13 wherein said bar has a weight per foot of 2.80 to 7.0 pounds and the thinner middle portion has a width sufficient to prevent solidification of steel between the end portions.

15. In a process for deoxidizing molten steel in an ingot mold wherein rapid solidification of molten steel adjacent the bottom and side wall portions of the mold occurs during the filling thereof, the improved deoxidizing process wherein said molten steel is contacted and reacted with deoxidizing metal comprising contacting said molten steel below the surface thereof with an end of an elongated bar composed of deoxidizing metal whereby said bar is consumed through reaction with said deoxidizing metal during the filling of said mold, said bar, in cross-section, being elongated and having a relatively thinner middle portion than end portions and being suspended and spaced apart from the bottom and side walls of said mold whereat said rapid solidification of the molten metal occurs and further positioned in said mold so that only one of the end portions faces the stream of molten metal filling said mold, said bar having a minimum thermal conductance capacity in excess of the capacity of the molten metal to transmit heat to the end of said bar and a maximum thermal conductance capacity less than the capacity of the molten metal to transmit heat to the entire submerged portion of said bar.

16. In a process for deoxidizing molten steel in an ingot mold by contact and reaction with deoxidizing metal during the filling of said mold, the improvement comprising contacting said molten steel below the surface thereof with an end of a bar composed of aluminum whereby said bar is consumed through reaction with said aluminum, said bar being suspended in said mold and comprising two elongated bar portions interconnected by a web portion and having a maximum thermal conductance capacity less than the capacity of the molten metal to transmit heat to the entire submerged portion of said bar, the length of said web portion being sufficient to prevent solidification of steel between said bar portions and the rate of filling said mold being such as to consume the end of said suspended bar at less than about 3 inches below the surface of said steel throughout the filling of the mold therewith.

17. In an aluminum bar adapted to be suspended in an ingot mold for the purpose of treating steel as it is poured into the ingot mold, the improvement which comprises an elongated bar of aluminum having longitudinally extending ends and sides defining a transverse cross-sectional shape having a width between said ends of approximately 3 times the maximum thickness between the sides and the thickness between the sides varying from a maximum adjacent each of said ends to a minimum adjacent the midpoint between said ends of approximately ½ the maximum thickness.

18. In an aluminum bar adapted to be positioned in an ingot mold for the purpose of treating steel as the molten steel is poured into the ingot mold, the improvement which comprises: an elongated bar of aluminum having a length of from 3 to 10 feet; said bar in transverse cross section having a width of approximately 3 to 4 inches, a longitudinally extending portion adjacent each end of said cross section having a thickness of approximately 1⅛ to 1⅜ inches, and a longitudinally extending portion spaced from said end having a thickness of approximately ⅝ to ¾ inches, and an opening at one end of said bar for receiving and coacting with means for suspending the bar in said ingot mold.

19. The combination of claim 18 wherein the thickness of the cross-sectional shape varies gradually from a maximum adjacent the longitudinally extending ends to a minimum of less than ½ the maximum adjacent the midpoint between said ends.

20. The aluminum bar of claim 17 wherein said bar has a weight per foot of from 2.80 to 7 pounds.

21. The aluminum bar of claim 17 wherein means are provided at one end for coacting with a suspending member.

22. In an elongated aluminum bar to be suspended in spaced relationship from the side walls of an open topped container and with its longitudinal axis generally vertical in said open topped container as molten steel is poured into and rises as a molten pool in the container to melt off the lower end of the bar, the improvement which comprises said aluminum bar having: a weight per foot of from 2.80 to 7 pounds; a surface area neglecting the end surface area per pound of aluminum in excess of 25 square inches; and, an opening in one end for receiving and coacting with means for suspending the bar in the container.

23. In an elongated aluminum bar to be suspended in spaced relationship from the side walls of an open topped container and with its longitudinal axis generally vertical in said open topped container as molten steel is poured into and rises as a molten pool in the container while melting off the lower end of the bar, the improvement which comprises said bar having: a length of from 3 to 10 feet; a weight per foot of from 2.80 to 7 pounds; a surface area neglecting the end per pound of aluminum of from 25 to 35 square inches; and an opening in one end for receiving and coacting with means for suspending the bar in the container.

24. The combination of a refractory container adapted to have molten steel poured thereinto, and an elongated aluminum bar positively positioned therein in such a manner as to be substantially spaced from the sides of the container and as to be progressively melted off as the molten steel rises in the container, the improvement which comprises: said bar having a length of from 3 to 10 feet, a weight per foot of from 2.80 to 7 pounds, and a surface area neglecting the end per pound of aluminum in excess of 25 square inches.

25. The combination of a refractory container adapted to have molten steel poured thereinto, and an elongated aluminum bar positively positioned therein in such a manner as to be substantially spaced from the sides of the container and as to have the lower end progressively melted off as the molten steel rises in the container, the improvement which comprises said bar having a transverse cross-sectional shape such that the longitudinally extending mid-portion is substantially thinner than the longitudinally extending end portions.

26. In the combination of an aluminum bar suspended in substantially spaced relationship to the sides of an ingot mold for the purpose of adding aluminum to steel as it is poured into the ingot mold, the improvement which comprises said bar being comprised of at least two longitudinally extending generally cylindrical portions in transversely spaced relationship and integrally joined by an intermediate web, said web having at least one concave surface.

27. The combination with an ingot mold of an aluminum bar positioned in the ingot mold substantially spaced from the sides thereof for the purpose of deoxidizing steel as the molten steel is poured thereinto, said bar being comprised of an elongated bar of aluminum having in transverse cross section a greater width than thickness, and at least one longitudinally extending portion intermediate the ends being approximately one half the thickness of the end portions.

28. The combination of claim 27 wherein at least one of the sides of said bar is concave.

29. The combination of claim 27 wherein both sides of said bar have a concave shape.

30. An elongated aluminum bar adapted to be placed in an ingot mold during the pouring of steel thereinto, said bar having a length of from three to ten feet and a weight per foot of from 2.80 to 7 lbs., said bar in cross-section consisting of two spaced solid cylindrical portions of aluminum having a diameter of 1⅛″ to 1½″ and integrally joined by an interconnecting web having concave arcuate surfaces generally tangential to the surfaces of the portions, said web having a minimum thickness midway between the cylinders of from .35 to .70 times the diameter of the portions, the centers of said cylinders being spaced from about 1.1 to 8 times the thickness of the web.

31. The aluminum bar of claim 30 wherein said bar has an opening at one end for coacting with suspension means.

32. An elongated aluminum bar adapted to be positioned in an ingot mold during the pouring of steel thereinto, said bar having a length of three to ten feet and a weight per foot of from 2.80 to 7 lbs., said bar in transverse cross-section consisting of two spaced solid cylindrical portions having a diameter of from 1⅛″ to 1½″ and integrally joined by a web portion, having concave arcuate surfaces tangential with the cylindrical portions, said web having a minimum thickness of from about .45 to about .55 times the diameter of the cylindrical portions, said cylindrical portions being spaced between centers from about 1.25 to about five times the minimum thickness of the web portion.

33. In an aluminum bar for the treating of steel as it is poured into an ingot mold, the improvement which comprises: an elongated aluminum member having a weight per foot of from 2.80 to 7 pounds, and a surface area per pound of aluminum related to the fill rate of an ingot mold in inches per minute, as approximately defined by the following formula: surface area equals 18+.123 times the fill rate.

References Cited in the file of this patent
UNITED STATES PATENTS

| | | |
|---|---|---|
| 1,053,738 | McNiff | Feb. 18, 1913 |
| 1,184,523 | Field | May 23, 1916 |
| 1,596,888 | Pacz | Aug. 24, 1926 |
| 2,295,007 | Plass | Sept. 8, 1942 |
| 2,355,156 | Haines | Aug. 8, 1944 |
| 2,405,274 | Stites | Aug. 6, 1946 |
| 2,480,516 | Stanier et al. | Aug. 30, 1949 |
| 2,480,899 | Bond | Sept. 6, 1949 |
| 2,495,273 | Lutts | Jan. 24, 1950 |
| 2,595,292 | Reece | May 6, 1952 |
| 2,732,339 | Webster et al. | Jan. 24, 1956 |